(12) United States Patent
Cheng

(10) Patent No.: US 9,286,371 B2
(45) Date of Patent: Mar. 15, 2016

(54) PRESENTING A MULTIDIMENSIONAL DECISION TABLE

(75) Inventor: Long Fung Cheng, Fremont, CA (US)

(73) Assignee: SAP SE, Walldorf (DE)

( * ) Notice: Subject to any disclaimer, the term of this patent is extended or adjusted under 35 U.S.C. 154(b) by 221 days.

(21) Appl. No.: 12/977,256

(22) Filed: Dec. 23, 2010

(65) Prior Publication Data
US 2012/0166489 A1 Jun. 28, 2012

(51) Int. Cl.
*G06F 7/00* (2006.01)
*G06F 17/30* (2006.01)

(52) U.S. Cl.
CPC ................................ *G06F 17/30592* (2013.01)

(58) Field of Classification Search
CPC .................................................. G06F 17/30592
USPC .......................................... 707/705, 736, 957
See application file for complete search history.

(56) References Cited

U.S. PATENT DOCUMENTS

| | | | | |
|---|---|---|---|---|
| 5,822,749 A * | 10/1998 | Agarwal | ............. | G06F 12/0866 |
| 6,191,792 B1 * | 2/2001 | Iizuka | ............... | G06F 17/30277 |
| | | | | 345/581 |
| 6,510,422 B1 * | 1/2003 | Galindo-Legaria | | G06F 17/30457 |
| 6,772,141 B1 * | 8/2004 | Pratt et al. | | |
| 6,865,573 B1 * | 3/2005 | Hornick et al. | ............... | 707/748 |
| 2002/0035559 A1 * | 3/2002 | Crowe | ............. | G06F 17/30321 |
| 2002/0055921 A1 * | 5/2002 | Yoshimura | ........ | G06F 17/30557 |
| 2002/0095397 A1 * | 7/2002 | Koskas | ............. | G06F 17/30324 |
| 2003/0182304 A1 * | 9/2003 | Summerlin et al. | .......... | 707/102 |
| 2004/0153437 A1 * | 8/2004 | Buchan | ............................. | 707/1 |
| 2004/0254931 A1 * | 12/2004 | Hook | ......................... | G06F 7/24 |
| 2004/0260675 A1 * | 12/2004 | Bruno | ............... | G06F 17/30333 |
| 2005/0021492 A1 * | 1/2005 | Safaei et al. | ........................ | 707/1 |
| 2005/0216496 A1 * | 9/2005 | Chickering | ............ | G06N 7/005 |
| 2006/0116984 A1 * | 6/2006 | Zurek | ............... | G06F 17/30592 |
| 2007/0276788 A1 * | 11/2007 | Cohen | ............... | G06F 17/30498 |
| 2008/0068401 A1 * | 3/2008 | Albrecht et al. | .............. | 345/645 |
| 2008/0294658 A1 * | 11/2008 | Lin | .................... | G06F 17/30542 |
| 2009/0063396 A1 * | 3/2009 | Gangarapu | ........ | G06F 17/30321 |
| 2009/0248671 A1 * | 10/2009 | Maruyama | ........ | G06F 17/30707 |
| 2010/0036815 A1 * | 2/2010 | Tago | .................. | G06F 17/30938 |
| | | | | 707/748 |
| 2010/0274756 A1 * | 10/2010 | Inokuchi | ........... | G06F 17/30592 |
| | | | | 707/602 |

OTHER PUBLICATIONS

'Demonstrates TableTree' [online] Demo Source, 2009, [retrieved on Dec. 20, 2010]. Retrieved from the Internet: <URL: http://www.java2s.com/Code/Java/SWT-JFace-Eclipse/DemonstratesTableTreeTableTree.htm>, 2 pages.

(Continued)

*Primary Examiner* — Jacob F Bétit
*Assistant Examiner* — Eliyah S Harper
(74) *Attorney, Agent, or Firm* — Fish & Richardson P.C.

(57) ABSTRACT

A computer-implemented method for presenting a multidimensional decision table includes: receiving a decision table that defines columns as respective dimensions, each row having a value in only one of the columns, the decision table specifying results for respective value combinations in the dimensions; identifying each value in an innermost dimension of the decision table; and generating a table representation for the decision table that has a corresponding column for each of the dimensions except the innermost dimension, and a separate column for each of the identified values, wherein the separate columns include corresponding ones of the results.

18 Claims, 5 Drawing Sheets

(56) References Cited

OTHER PUBLICATIONS

'Replicating a Tree Table' [online]. Maxdesign, 2005, [retrieved on Dec. 20, 2010]. Retrieved from the Internet: <URL: http://www.maxdesign.com.au/articles/tree-table/>, 6 pages.

'Nested join on same table (tree structure)' [online]. Stack Overflow, 2009, [retrieved on Dec. 20, 2010]. Retrieved from the Internet: <URL: http://stackoverflow.com/questions/1782389/nested-join-on-same-table-tree-structure>, 3 pages.

'Double click to edit a table tree' [online]. Tree Table, 2009, [retrieved on Dec. 20, 2010]. Retrieved from the Internet: <URL: http://www.java2s.com/Code/Java/GWT/DoubleclicktoeditatabletreeExtGWT.htm>, 4 pages.

* cited by examiner

PRESENTING A MULTIDIMENSIONAL DECISION TABLE

TECHNICAL FIELD

This document relates to presenting a multidimensional decision table.

BACKGROUND

Computer systems are configured to include a collection of modules, components or other entities that take part in the operation of the system and that can affect its behavior in one or more ways. Such units can be considered the modules that make up the system and they are often implemented as software components. Software can be written in any of a number of programming languages and is generally used to cause a processor to execute specific instructions.

Computer systems are implemented for use in situations where business decisions must be made as part of ongoing transactions. Some such decisions involve calculation of charges, choosing between messages to send, and selecting an action to take in a particular situation. For example, a manufacturer whose business involves shipping goods to customers implements a computer-based decision function that automatically selects the appropriate transportation mode for each shipment and assesses the applicable charge to the customer based on relevant circumstances. In some systems, decisions are made using a decision table where the correct decision is associated with metadata corresponding to a particular set of circumstances. When the decision table is queried or otherwise polled using information for the shipment at hand, the decision table returns a pre formulated decision, if one exists, and can otherwise return a default decision.

SUMMARY

The invention relates to presenting a multidimensional decision table.

In a first aspect, a computer-implemented method for presenting a multidimensional decision table includes: receiving a decision table that defines columns as respective dimensions, each row having a value in only one of the columns, the decision table specifying results for respective value combinations in the dimensions; identifying each value in an innermost dimension of the decision table; and generating a table representation for the decision table that has a corresponding column for each of the dimensions except the innermost dimension, and a separate column for each of the identified values, wherein the separate columns include corresponding ones of the results.

In a second aspect, a computer program product tangibly embodied in a computer-readable storage medium includes instructions that when executed by a processor perform a method for presenting a multidimensional decision table. The method includes: receiving a decision table that defines columns as respective dimensions, each row having a value in only one of the columns, the decision table specifying results for respective value combinations in the dimensions; identifying each value in an innermost dimension of the decision table; and generating a table representation for the decision table that has a corresponding column for each of the dimensions except the innermost dimension, and a separate column for each of the identified values, wherein the separate columns include corresponding ones of the results.

In a third aspect, a system includes: processor; output device; and computer program product tangibly embodied in a computer-readable storage medium and including instructions that when executed by the processor perform a method for presenting a multidimensional decision table on the output device. The method includes: receiving a decision table that defines columns as respective dimensions, each row having a value in only one of the columns, the decision table specifying results for respective value combinations in the dimensions; identifying each value in an innermost dimension of the decision table; and generating a table representation for the decision table that has a corresponding column for each of the dimensions except the innermost dimension, and a separate column for each of the identified values, wherein the separate columns include corresponding ones of the results.

Implementations can include any or all of the following features. The method further includes generating another table representation for the decision table, the other table representation having the columns of the decision table but wherein each row includes one of the value combinations and its corresponding result. The method further includes toggling between displaying any two of the decision table, the table representation and the other table representation. The method further includes updating the decision table with an edit that a user makes under guidance of any one of the decision table, the table representation and the other table representation. The edit includes at least one change selected from: modifying one of the values, modifying one of the results, adding a row or column, deleting a row or column, and combinations thereof. The decision table includes a tree of the values and the results, and hiding any portion of the tree in the decision table causes the portion to also be hidden in the table representation and the other table representation. The method further includes omitting at least one of the rows and corresponding information from the table representation.

Implementations can provide any or all of the following advantages. Visualization of decision tables can be improved. User review and modification of decision tables can be made more efficient. Multiple presentation modes can render a decision table more flexible to use.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which one or more representations of a decision table are presented. For example, in one representation the contents of an innermost dimension that were previously listed vertically in one column are instead distributed in a horizontal fashion over multiple columns. As another example, the representation can merge metadata from separate rows in the decision table to make the presentation easier to overview or edit. The user can toggle between representations to the one that best suits the user's needs.

Figure 1:
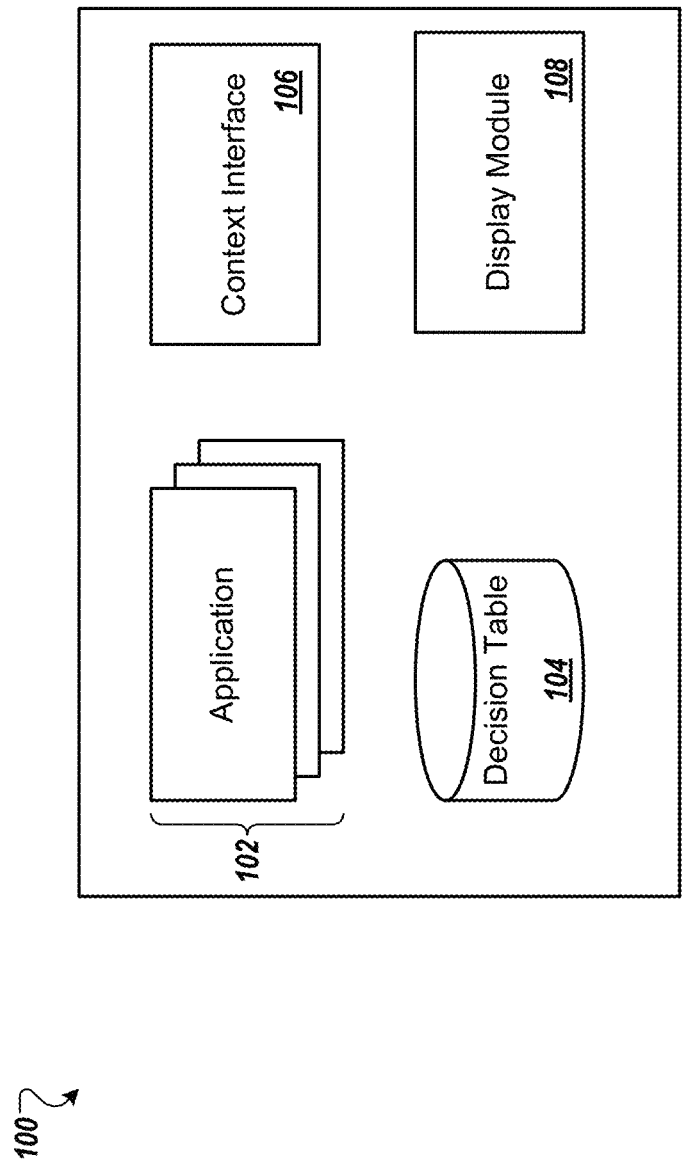
FIG. 1 is a block diagram of a system that can present a multidimensional decision table.

FIG. 1 is a block diagram of a system 100 that can present a multidimensional decision table. The system 100 here includes multiple applications 102. In some implementations, one or more of the applications 102 can relate to enterprise resources planning (ERP) functions. For example, the applications 102 can include a customer relationship management (CRM) application that handles sales transactions, including shipping logistics.

One or more decision tables 104 are used by the application(s) 102, including, but not limited to, in CRM-functions or other ERP-functions. For example, the decision table is used to select an appropriate shipping method and calculate the applicable cost for each of multiple shipments managed by the system 100. The applications 102 can be implemented using any suitable programming language and can be stored in a computer-readable storage medium.

The system 100 will use information from outside sources for one or more purposes. For example, one or more of the applications 102 needs information about each specific shipment to select the correct transportation mode. In some implementations, the system 100 includes a context interface 106 that collects the relevant information and makes it available for decision-making. For example, the context interface 106 can display one or more screens to a user with accompanying input controls so that the user can input the applicable information. As another example, any or all of the applications 102 can collect the necessary information and provide it for running queries on the decision table 104.

After the decision table 104 is queried with one or more characteristics based on the current situation, a result is obtained. In some implementations, the result specifies an action that the system 100 and/or the application(s) 102 should perform. For example, the result can specify that the shipping mode "Air overnight" should be chosen, and that the cost to the customer is calculated according to the schedule "Preferred customer". The system 100 or the application(s) 102 can then undertake the necessary measure(s) to implement this decision. For example, a warehouse is notified to prepare the goods as air cargo and a billing system is updated according to the selected cost schedule.

In some situations, a user such as a system administrator needs to inspect the decision table 104 in whole or in part. For example, the user wishes to verify that the decision table specifies the correct decision for a specific situation. As another example, the user has been tasked with revising or otherwise updating the decision table regarding the listed characteristics or the specified decisions, or both. For these and other purposes, the system 100 includes a display module 108 that generates one or more representations of the decision table to a user. For example, the display module 108 renders some or all of the decision table 104 on a display device. Examples of such representations will now be described.

Figure 2:
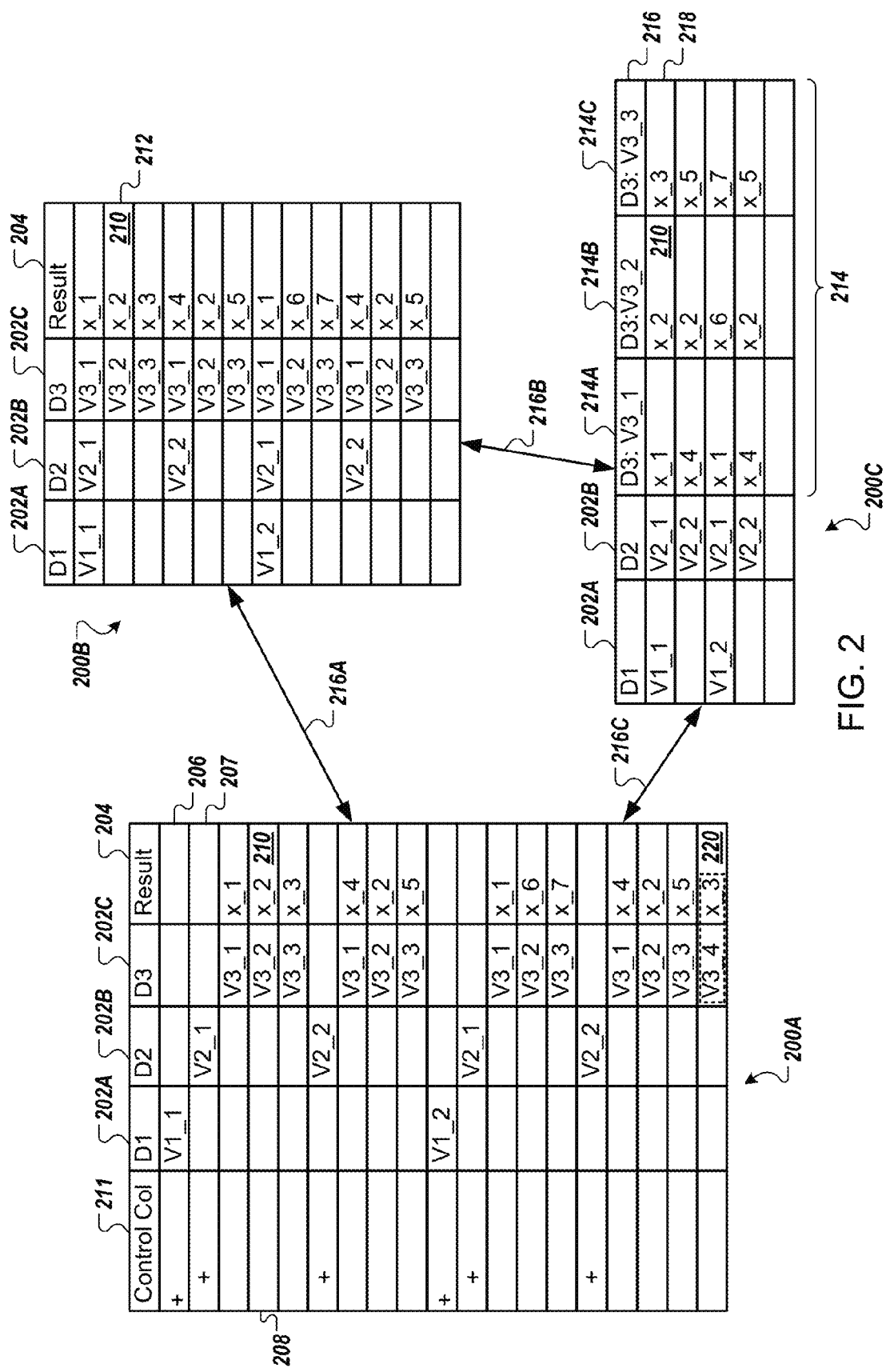
FIG. 2 schematically shows representations of a decision table.

FIG. 2 schematically shows representations 200A-C of a decision table. In some implementations, the decision table corresponds to the decision table 104 in FIG. 1. For example, the display module 108 (FIG. 1) renders each of the representations 200A-C on one or more display devices.

Representation 200A here corresponds to a table tree. That is, the representation 200A in this example contains metadata columns 202A-C labeled D1, D2 and D3, respectively. The values in the metadata columns are metadata that will be compared to the query data in each situation to determine if there is a match. For example, the column 202A here includes metadata entries V1_1 and V1_2 for illustrative purposes. That is, in an example where the metadata column 202A corresponds to the value of the order being shipped, the metadata entry V1_1 would represent order values below a cutoff order amount (e.g., $500), and the metadata entry V1_2 would represent order values at or above the cutoff amount.

Similarly, the metadata column 202B here includes metadata entries V2_1 and V2_2 for illustrative purposes. For example, the entry V2_1 specifies that the order is being shipped to a domestic address, and the entry V2_2 specifies that the order is being shipped internationally. Finally, the entries V3_1, V3_2 and V3_3 in the metadata column 202C can correspond to how urgent the delivery is. The metadata column 202C is here the last of the three metadata columns and is considered the "innermost" column.

The representation 200A contains a result column 204 that specifies a decision outcome for each value listed in the innermost column (i.e., here the metadata column 202C). For illustration purposes, the decision outcomes are here specified as "x_1," "x_2," "x_3" and so on. Some decision outcomes occur more than once in the result column 204. Continuing the above example, the decision outcomes in the results column 204 correspond to different shipment methods and/or cost schedules to be applied under various circumstances.

The following is an example of how the metadata values in the decision table are read. Assume that the applicable characteristics to a particular customer order are: V1_1 for the order value, V2_1 indicating that the shipment is domestic, and V3_2 indicating normal urgency. First, it is determined that the characteristic V1_1 matches the metadata entry on a row 206 in the metadata column 202A. Accordingly, the bottom half of the decision table does not apply to the current shipment. Second, it is determined that the characteristic V2_1 matches the metadata entry on a row 207 in the metadata column 202B. Finally, it is determined that the characteristic V3_2 matches the metadata entry on a row 208 in the metadata column 202C. Because the latter is here the innermost column, a result 210 is identified (here, "x_2") for the current characteristics, and this result specifies the shipment method and/or cost schedule to use.

A control column 211 represents the ability to collapse or expand selected portions of the table tree. For example, each entry in the metadata column 202A here has a "+" symbol in the control column, indicating that the various sub-combinations of metadata under that value are currently shown. In contrast, if any of those entries were to be collapsed in the table tree, its metadata sub-combinations would cease to be shown and the symbol would change to a minus (−) in the control column 211. Similarly, each entry in the metadata column 202B here also has a "+" symbol in the control column, indicating that they are currently expanded.

In the representation 200A, each row includes only one metadata value. For example, each of the rows 206-208 has only a single metadata value each, in a corresponding one of the metadata columns. It follows that the representation 200A contains a substantial number of empty or blank cells. Such empty space can make the table difficult to overview for a user, because there is not a result specified on each row.

The representation 200B, in contrast, presents the same information as the representation 200A using less empty space. In a sense, the representation 200B can be seen as a "compressed" version of the representation 200A, in that the entries in the metadata column 202C are seen to have moved upward in the table so as to eliminate empty spaces that previously occurred between some rows. The semantics of the decision table are intact, however: Each combination of metadata values in the three columns is associated with the same decision outcome in the column 204 as in the representation 200A. For example, a row 212 indicates that the decision outcome 210 remains associated with the same characteristics as before (i.e., V1_1, V2_1 and V3_2).

To a user viewing the decision table on a display device, the representation 200B may be easier to comprehend and work with. For example, each set of metadata values is listed in level with the corresponding specified result, meaning that the person can read them left to right on one row, unlike the staggered rows of the representation 200A. The representation 200B is not a true table tree, and the control column 211 is thus omitted.

The representation 200C, in turn, corresponds to yet another form of displaying the same decision-table information using less space. Particularly, the entries of the innermost column (column 202C in these examples), and the corresponding decision outcomes of the column 204, are here instead distributed over multiple columns 214. In the representation 200C, the columns 202C and 204 are therefore omitted but the other metadata columns (i.e., columns 202A and B in this example) remain.

The number of the columns 214 that are used depends on the number of unique metadata values of the innermost column. In this example, the column 202C (e.g., in the representation 200A) has three unique values, and each value is therefore assigned to a different one of the columns 214. That is, a header 216 here indicates that the column 214A corresponds to the metadata value V3_1, the column 214B to the value V3_2 and the column 214C to the value V3_3. The representation 200C can be read by first identifying a row 218 that matches the characteristics V1_1 and V2_1. On the identified row 218, then, one selects the appropriate one of the columns 214A-C based on the characteristic for the innermost dimension. Here, the value V3_2 leads to the column 214B, and there the decision outcome 210 (i.e., "x_2" in this example) is found.

It is seen that each of the representations 200B and 200C presents the data of the representation 200A using significantly less table space. For example, the total number of grid cells needed for the representation 200A is 19 rows by 5 columns, or 19×5=95 grid cells. In contrast, the representation 200B needs only 12 rows by 4 columns, or 12×4=36 grid cells. Finally, the representation 200C needs merely 5 rows by 5 columns, or 5×5=25 grid cells. This means that information is presented more efficiently to the user in the representations 200B and C, and the user can more easily overview it. On the other hand, the style used in the representation 200A can reflect the inherent structure of the database that facilitates the searching for the correct decision.

In some implementations, the user can toggle between any two of the representations 200A-C, as schematically indicated by arrows 216A-C. That is, whichever one of the representations is currently displayed, the user can make an input with a suitable input control (e.g., a command selectable on the screen, or a physical button on the device) to toggle to any of the other two representations.

The visual appearance of the decision table can be customized. In some implementations, the user can remove one or more non-applicable aspects from display. For example, assume that the decision table includes a row 220 that has a value in the innermost column 202C and a corresponding decision outcome in the column 204. Further, assume that this decision is not applicable in a particular situation. The user therefore causes the row 220 to be removed, as here schematically illustrated by a dashed outline. The removal action can be triggered by selecting the row 220 and generating a specific remove command (e.g., by clicking a button), to name one example. Accordingly, the row 220 has been omitted in the representation 200A. As a result, this row also does not appear in any of the representations 200B or 200C. Removal of non-applicable rows can further reduce the size of the visual representation. Nevertheless, the underlying decision table still contains the information corresponding to the removed row(s), and the user can reinstate one or more of the rows by a corresponding command.

Moreover, the user can edit the underlying decision table 104 (FIG. 1) from any or all of the representations 200A-C. For example, the user can revise any or all of the metadata entries and/or the decision outcomes, and the system updates the decision table accordingly to reflect this change. As another example, the user can add or delete rows or columns in any of the representations, and the corresponding revision is registered.

Figure 3:
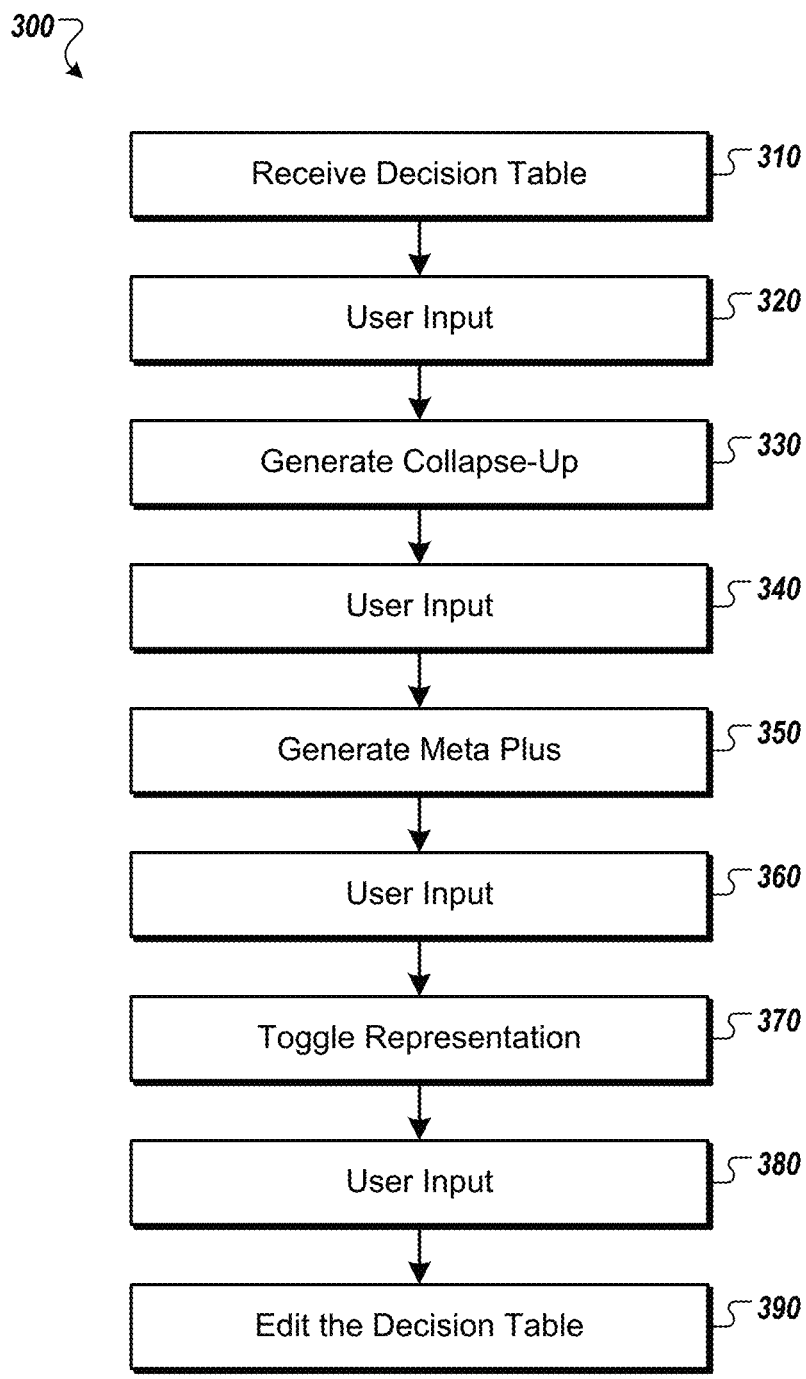
FIG. 3 is a flowchart of operations that can be performed in presenting a multidimensional decision table.

FIG. 3 is a flowchart of operations 300 that can be performed in presenting a multidimensional decision table. The operations 300 can be performed by a processor executing instructions stored in a computer-readable medium, for example in the system 100 (FIG. 1).

At 310, a decision table is received. For example, the system 100 receives the decision table 104 which has been created elsewhere, or the system 100 receives user-entered edits that it stores as a new instance of the table. The decision table can be displayed, such as by the representation 200A, launching a program in the system 100 that is designed for maintaining and updating decision tables.

At 320, a user makes an input for a representation of the decision table. If a representation is currently shown, the input instead requests another representation.

At 330, a "collapse-up" representation is generated and rendered. For example, the representation 200B can be considered an upwards collapsing of the entries in the innermost column (here, column 202C).

At 340, a user makes an input for a representation of the decision table. If a representation is currently shown, the input instead requests another representation.

At 350, a "meta plus" representation is generated and rendered. For example, the representation 200C can be said to add additional metadata columns for the unique values of the innermost column.

At 360, a user input toggling between two representations is received.

At 370, the currently shown representation is replaced by the one being toggled to, for example according to an applicable one of the arrows 216A-C.

At 380, a user input making a revision is received. The input can be made in any or all of the representations 200A-C. For example, the user alters metadata and/or decision outcomes by keyboard input, or adds/deletes rows or columns by command(s).

At 390, the underlying decision table is edited, for example the table 104 by the system 100. The next time a representation of this decision table is rendered, it will reflect the edit(s).

Figure 4:
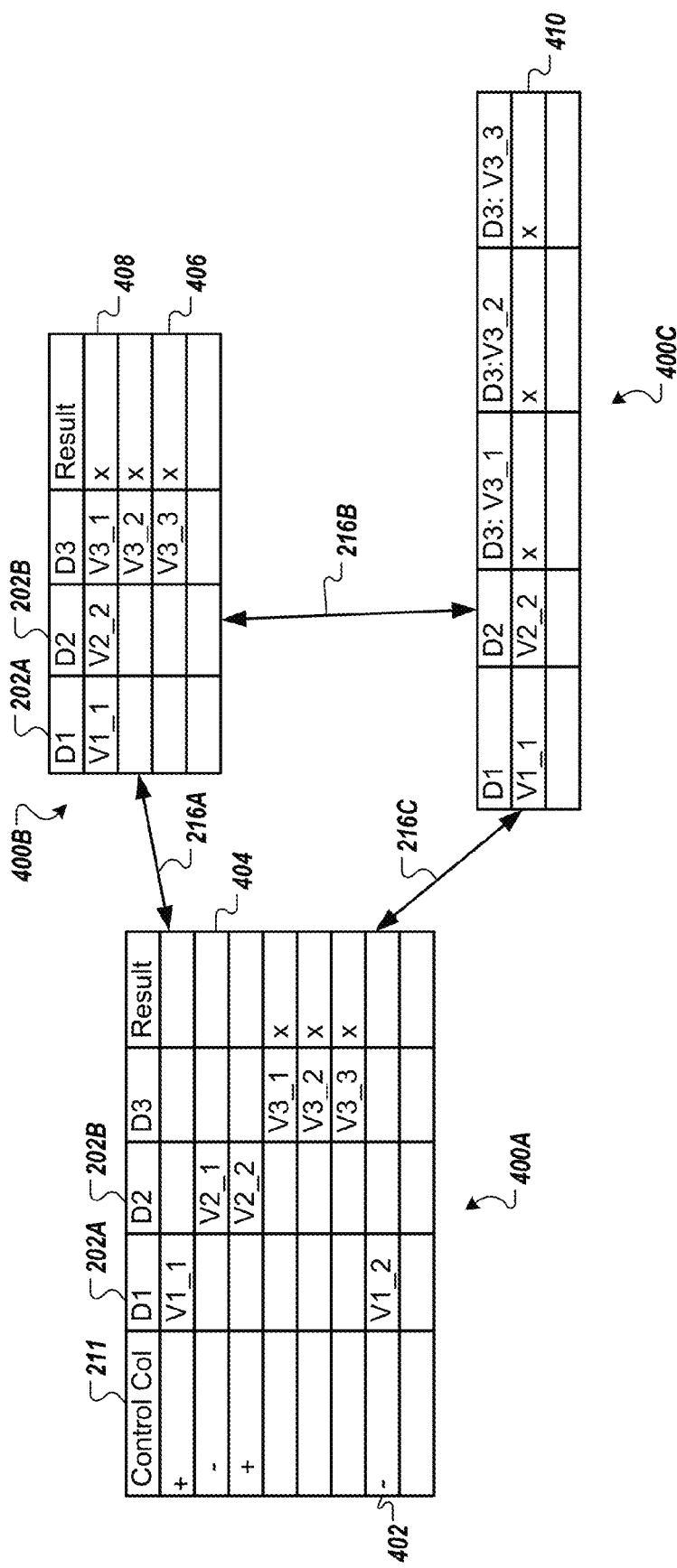
FIG. 4 schematically shows other representations of a decision table.

FIG. 4 schematically shows other representations 400A-C of a decision table. In these representations, combinations of metadata are hidden by collapsing one or more rows. For example, in the control column 211 of the representation 400A, a row 402 is seen to have a minus (−) symbol. This indicates that all metadata combinations that have the indicated metadata value (i.e., the value V1_2 in the column 202A, in this example) are currently not being presented. This can simplify the user's review of the representation 400A when those metadata combinations are not of interest. Similarly, a row 404 also has the minus symbol in the column 211, indicating that all metadata combinations under the value V1_1 that have the value V2_1 in the column 202B are currently not presented. Other metadata combinations under the value V1_1 are displayed, however. That is, the current configuration of collapsed and expanded metadata sections is a selection made by the user at will.

Upon toggling to another representation, the user's selection is maintained. For example, the representation 400B does not currently display any metadata combinations that have the metadata value V1_2 in the column 202A. This is because the user has hidden or collapsed those combinations. In other words, because the last row 406 of the representation 400B relates to the value V1_1, which would precede the value V1_2 in this example, it is seen that the collapsed rows are hidden also in this representation.

Similarly, the representation 400B does not currently display any metadata combinations that have the metadata value V2_1 in the column 202B, as indicated by the first row being a row 408 that relates to the metadata value V2_2, which would follow the row(s) relating to the value V2_1 in this example.

Finally, the representation 400C here includes only a single row 410 because the user has collapsed the other metadata combinations. Thus, this is another example of the space saving and more easily comprehensible presentation of a decision table that renderings such as the representation 400C can provide.

Figure 5:
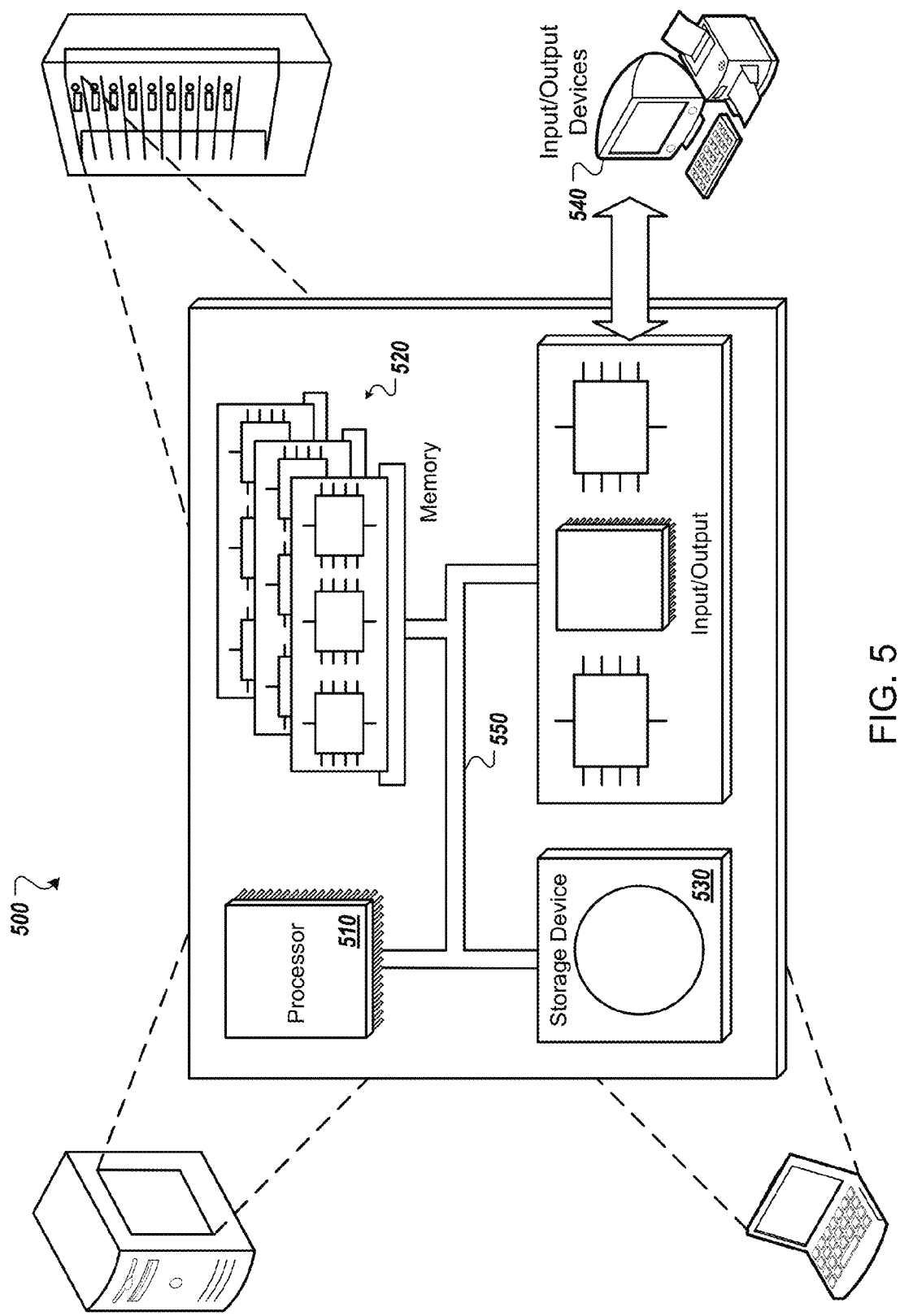
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
   displaying, by a computing system, a first decision table that includes:
   (i) multiple rows,
   (ii) a first quantity of dimension columns, and
   (iii) a result column,
   wherein:
   each of the multiple rows of the first decision table displays a value in only one of the dimension columns of the first decision table,
   the first decision table displays results within a subset of the multiple rows of the result column, and
   each of the results specifies an outcome of combining a value from each of the dimension columns of the first decision table;
   receiving, by the computing system, an indication that a user supplied input to generate a reduced-size representation of the first decision table;
   identifying, by the computing system, a set of values that are repeatedly displayed within a first dimension column from the first quantity of dimension columns of the first decision table, wherein the set of values are associated with a value in another of the dimension columns in the first decision table; and
   displaying, by the computing system, the reduced size representation of the first decision table by displaying a second decision table that includes:
   (i) a plurality of rows that is less than a quantity of the multiple rows of the first decision table,
   (ii) a second quantity of dimension columns that includes the dimension columns of the first decision table except for the first dimension column, and
   (iii) a quantity of value columns that is the same as a quantity of values in the set of values, wherein:
   each of the second quantity of dimension columns of the second decision table includes all of the values from the respective dimension column of the first decision table,
   each of the value columns corresponds to a respective one of the values included in the set of values, and
   each of the value columns displays, within its rows, the results that are from the single result column of the first decision table and that are specified by the corresponding respective one of the values included in the set of values, wherein all of the results from the result column are displayed in the value columns of the second decision table.

2. The computer-implemented method of claim 1, wherein the first dimension column is an innermost dimension column of the first decision table.

3. The computer-implemented method of claim 1, wherein computer-based decisions are made automatically using the first decision table.

4. The computer-implemented method of claim 1, further comprising receiving user input to collapse a display of a first set of rows of the multiple rows in the first decision table and, as a result, ceasing to display the first set of the rows of the first decision table.

5. The computer-implemented method of claim 1, wherein the first decision table includes a tree of the values of the dimension columns of the first decision table, and receiving user input to hide a certain portion of the values in the tree causes the certain portion of the values to be hidden in both the display of the first decision table and in the display of the second decision table.

6. The computer-implemented method of claim 1, further comprising:
   receiving, by the computing system, an indication that the user supplied input to generate another reduced-size representation of the first decision table; and
   displaying, by the computing system, another reduced size representation of the first decision table by displaying a third decision table that includes:
   (i) a plurality of rows that is equal to a quantity of the subset of multiple rows that display the results in the result column of the first decision table,
   (ii) a third quantity of dimension columns equal to the first quantity of dimension columns, and
   (iii) an other result column,
   wherein:
   each of the third quantity of dimension columns of the third decision table includes all of the values from the respective dimension column of the first decision table,
   each of the plurality of rows of the third decision table displays a value in at least one of the dimension columns of the third decision table and displays a value in the other result column, wherein all of the results from the result column are displayed in the third decision table, and
   for each row of the third decision table, the value displayed in the other result column specifies an outcome of combining a value from each of the dimension columns of the third decision table.

7. A non-transitory computer-readable storage medium that comprises instructions that, when executed by a processor, cause performance of a method comprising:
   displaying, by a computing system, a first decision table that includes:
   (i) multiple rows,
   (ii) a first quantity of dimension columns, and
   (iii) a result column,
   wherein:
   each of the multiple rows of the first decision table displays a value in only one of the dimension columns of the first decision table,
   the first decision table displays results within a subset of the multiple rows of the result column, and
   each of the results specifies an outcome of combining a value from each of the dimension columns of the first decision table;
   receiving, by the computing system, an indication that a user supplied input to generate a reduced-size representation of the first decision table;
   identifying, by the computing system, a set of values that are repeatedly displayed within a first dimension column from the first quantity of dimension columns of the first decision table, wherein the set of values are associated with a value in another of the dimension columns in the first decision table; and
   displaying, by the computing system, the reduced size representation of the first decision table by displaying a second decision table that includes:
   (i) a plurality of rows that is less than a quantity of the multiple rows of the first decision table,
   (ii) a second quantity of dimension columns that includes the dimension columns of the first decision table except for the first dimension column, and
   (iii) a quantity of value columns that is the same as a quantity of values in the set of values, wherein:

each of the second quantity of dimension columns of the second decision table includes all of the values from the respective dimension column of the first decision table, each of the value columns corresponds to a respective one of the values included in the set of values, and each of the value columns displays, within its rows, the results that are from the single result column of the first decision table and that are specified by the corresponding respective one of the values included in the set of values, wherein all of the results from the result column are displayed in the value columns of the second decision table.

8. The non-transitory computer-readable storage medium of claim 7, wherein the first dimension column is an innermost dimension column of the first decision table.

9. The non-transitory computer-readable storage medium of claim 7, wherein computer-based decisions are made automatically using the first decision table.

10. The non-transitory computer-readable storage medium of claim 7, wherein the method further comprises receiving user input to collapse a display of a first set of rows of the multiple rows in the first decision table and, as a result, ceasing to display the first set of the rows of the first decision table.

11. The non-transitory computer-readable storage medium of claim 7, wherein the first decision table includes a tree of the values of the dimension columns of the first decision table, and wherein the operation of receiving user input to hide a certain portion of the values in the tree causes the certain portion of the values to be hidden in both the display of the first decision table and in the display of the second decision table.

12. The non-transitory computer-readable storage medium of claim 7, wherein the method further comprises:

receiving, by the computing system, an indication that the user supplied input to generate another reduced-size representation of the first decision table; and displaying, by the computing system, another reduced size representation of the first decision table by displaying a third decision table that includes:
(i) a plurality of rows that is equal to a quantity of the subset of multiple rows that display the results in the result column of the first decision table,
(ii) a third quantity of dimension columns equal to the first quantity of dimension columns, and
(iii) an other result column,
wherein:
each of the third quantity of dimension columns of the second decision table includes all of the values from the respective dimension columns of the first decision table,
each of the plurality of rows of the third decision table displays a value in at least one of the dimension columns of the third decision table and displays a value in the other result column, wherein all of the results from the result column are displayed in the third decision table, and
for each row of the third decision table, the value displayed in the other result column specifies an outcome of combining a value from each of the dimension columns of the third decision table.

13. A system comprising:
a processor;
an output device; and
a computer program product tangibly embodied in a computer-readable storage medium and comprising instructions that, when executed by the processor, cause performance of a method comprising:

displaying, by a computing system on the output device, a first decision table that includes:
(i) multiple rows,
(ii) a first quantity of dimension columns, and
(iii) a result column,
wherein:
each of the multiple rows of the first decision table displays a value in only one of the dimension columns of the first decision table,
the first decision table displays results within a subset of the multiple rows of the result column, and
each of the results specifies an outcome of combining a value from each of the dimension columns of the first decision table;

receiving, by the computing system, an indication that a user supplied input to generate a reduced-size representation of the first decision table;

identifying, by the computing system, a set of values that are repeatedly displayed within a first dimension column from the first quantity of dimension columns of the first decision table, wherein the set of values are associated with a value in another of the dimension columns in the first decision table; and displaying, by the computing system on the output device, a reduced size representation of the first decision table by displaying the second decision table that includes:
(i) a plurality of rows that is less than a quantity of the multiple rows of the first decision table,
(ii) a second quantity of dimension columns that includes the dimension columns of the first decision table except for the first dimension column, and
(iii) a quantity of value columns that is the same as a quantity of values in the set of values, wherein:
each of the second quantity of dimension columns of the second decision table includes all of the values from the respective dimension column of the first decision table,
each of the value columns corresponds to a respective one of the values included in the set of values, and
each of the value columns displays, within its rows, the results that are from the single result column of the first decision table and that are specified by the corresponding respective one of the values included in the set of values, wherein all of the results from the result column are displayed in the value columns of the second decision table.

14. The system of claim 13, wherein the first dimension column is an innermost dimension column of the first decision table.

15. The system of claim 13, wherein computer-based decisions are made automatically using the first decision table.

16. The system of claim 13, wherein the method further comprises receiving user input to collapse a display of a first set of rows of the multiple rows in the first decision table and, as a result, ceasing to display the first set of the rows of the first decision table.

17. The system of claim 13, wherein the first decision table includes a tree of the values of the dimension columns of the first decision table, and receiving user input to hide a certain portion of the values in the tree causes the certain portion of the values to be hidden in both the display of the first decision table and in the display of the second decision table.

18. The system of claim 13, wherein the method further comprises:
   receiving, by the computing system, an indication that the user supplied input to generate another reduced-size representation of the first decision table; and
   displaying, by the computing system, another reduced size representation of the first decision table by displaying a third decision table that includes:
      (i) a plurality of rows that is equal to a quantity of the subset of multiple rows that display the results in the result column of the first decision table,
      (ii) a third quantity of dimension columns equal to the first quantity of dimension columns, and
      (iii) an other result column,
   wherein:
      each of the third quantity of dimension columns of the third decision table includes all of the values from the respective dimension column of the first decision table,
      each of the plurality of rows of the third decision table displays a value in at least one of the dimension columns of the third decision table and displays a value in the other result column, wherein all of the results from the result column are displayed in the third decision table, and
      for each row of the third decision table, the value displayed in the other result column specifies an outcome of combining a value from each of the dimension columns of the third decision table.

* * * * *